United States Patent
Yamanaka et al.

(10) Patent No.: US 9,036,387 B2
(45) Date of Patent: May 19, 2015

(54) ALTERNATING-CURRENT/DIRECT-CURRENT CONVERTER

(71) Applicant: KABUSHIKI KAISHA YASKAWA DENKI, Kitakyushu-shi (JP)

(72) Inventors: Katsutoshi Yamanaka, Kitakyushu (JP); Hidenori Hara, Kitakyushu (JP); Yushi Takatsuka, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 287 days.

(21) Appl. No.: 13/645,709

(22) Filed: Oct. 5, 2012

(65) Prior Publication Data

US 2013/0088904 A1 Apr. 11, 2013

(30) Foreign Application Priority Data

Oct. 7, 2011 (JP) .................................. 2011-222747

(51) Int. Cl.
*H02M 1/42* (2007.01)
*H02M 7/219* (2006.01)
*H02M 1/00* (2006.01)

(52) U.S. Cl.
CPC ............ *H02M 1/4225* (2013.01); *Y02B 70/126* (2013.01); *H02M 7/219* (2013.01); *H02M 2001/0054* (2013.01); *Y02B 70/1491* (2013.01)

(58) Field of Classification Search
USPC ............... 323/282–290; 363/81–91, 125–128
See application file for complete search history.

(56) References Cited

U.S. PATENT DOCUMENTS

| | | | |
|---|---|---|---|
| 5,883,502 A | 3/1999 | Spitaler | |
| 7,148,660 B2 * | 12/2006 | Ghosh et al. | 323/207 |
| 7,564,706 B1 * | 7/2009 | Herbert | 363/124 |
| 8,355,268 B2 * | 1/2013 | Boeke | 363/65 |
| 8,957,542 B2 * | 2/2015 | Dighrasker et al. | 307/2 |
| 2007/0217233 A1 | 9/2007 | Lim et al. | |
| 2008/0002444 A1 | 1/2008 | Shekhawat et al. | |
| 2008/0316775 A1 | 12/2008 | Tsai et al. | |
| 2010/0039080 A1 * | 2/2010 | Schoenbauer et al. | 323/234 |
| 2010/0201285 A1 * | 8/2010 | Dellian et al. | 315/294 |

(Continued)

FOREIGN PATENT DOCUMENTS

| | | |
|---|---|---|
| EP | 1835608 | 9/2007 |
| EP | 2330732 | 6/2011 |

(Continued)

OTHER PUBLICATIONS

Japanese Office Action for corresponding JP Application No. 2011-222747, Nov. 19, 2013.

(Continued)

*Primary Examiner* — Jessica Han
(74) *Attorney, Agent, or Firm* — Mori & Ward, LLP (57) ABSTRACT

An alternating-current/direct-current converter includes a rectifier, a reactor, a capacitor, and a switching rectifier. The rectifier is configured to rectify alternating-current voltage output from an alternating-current power source, thereby converting the alternating-current voltage into direct-current voltage, and to output the direct-current voltage. The capacitor includes terminals. The switching rectifier is coupled to the AC power source and switchable to output the direct-current voltage to the capacitor.

19 Claims, 5 Drawing Sheets

(56) References Cited

U.S. PATENT DOCUMENTS

| 2010/0309699 | A1 | 12/2010 | Nishikawa |
| 2011/0134671 | A1 | 6/2011 | Balocco |
| 2012/0020135 | A1* | 1/2012 | McCune ............... 363/127 |
| 2013/0121045 | A1* | 5/2013 | Murakami et al. ......... 363/67 |

FOREIGN PATENT DOCUMENTS

| JP | 2003-153541 | 5/2003 |
| JP | 2005-143212 | 6/2005 |
| JP | 2008-295248 | 12/2008 |
| JP | 2010-283953 | 12/2010 |
| WO | WO 96/19036 | 6/1996 |

OTHER PUBLICATIONS

Tollik et al., "Comparative Analysis Of 1-Phase Active Power Factor Correction Topologies", Proceedings Of The International Telecommunications Energy Conference, Oct. 4-8, 1992, vol. CONF. 14, pp. 517-523, XP000357572, See Cite No. 10.
Extended European Search Report for corresponding EP Application No. 12187453.1-1809, Mar. 7, 2014.
Japanese Office Action for corresponding JP Application No. 2011-222747, Aug. 6, 2013.
Chinese Office Action for corresponding CN Application No. 201210370118.4, Jun. 25, 2014.
Chinese Office Action for corresponding CN Application No. 201210370118.4, Dec. 17, 2014.

* cited by examiner

ALTERNATING-CURRENT/DIRECT-CURRENT CONVERTER

CROSS-REFERENCE TO RELATED APPLICATIONS

The present application claims priority under 35 U.S.C. §119 to Japanese Patent Application No. 2011-222747, filed Oct. 7, 2011. The contents of this application are incorporated herein by reference in their entirety.

BACKGROUND OF THE INVENTION

1. Field of the Invention

The present invention relates to an alternating-current/direct-current converter.

2. Discussion of the Background

Japanese Unexamined Patent Application Publication No. 2008-295248 discloses a conventional alternating-current/direct-current (AC/DC) converter. In the conventional AC/DC converter, a rectification step-down chopper circuit and a boost chopper circuit are arranged in series to constitute a power-factor improving converter to improve power factor.

SUMMARY OF THE INVENTION

According to one aspect of the present invention, an alternating-current/direct-current converter includes a rectifier, a reactor, a capacitor, and a switching rectifier. The rectifier is configured to rectify alternating-current voltage output from an alternating-current power source, thereby converting the alternating-current voltage into direct-current voltage, and to output the direct-current voltage. The capacitor includes terminals. The switching rectifier is coupled to the alternating-current power source and switchable to output the direct-current voltage to the capacitor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

An alternating-current/direct-current converter according to any of the embodiments of the present invention will be described by referring to FIGS. 1 to 5A and 5B. It will be appreciated that the embodiments and the accompanying drawings are not intended to limit the present invention, but that the present invention is intended to embrace all such alternatives, modifications, equivalents and variations that are within the spirit and scope of the present invention.

[Principles of the Embodiments of the Present Invention]

Figure 1:
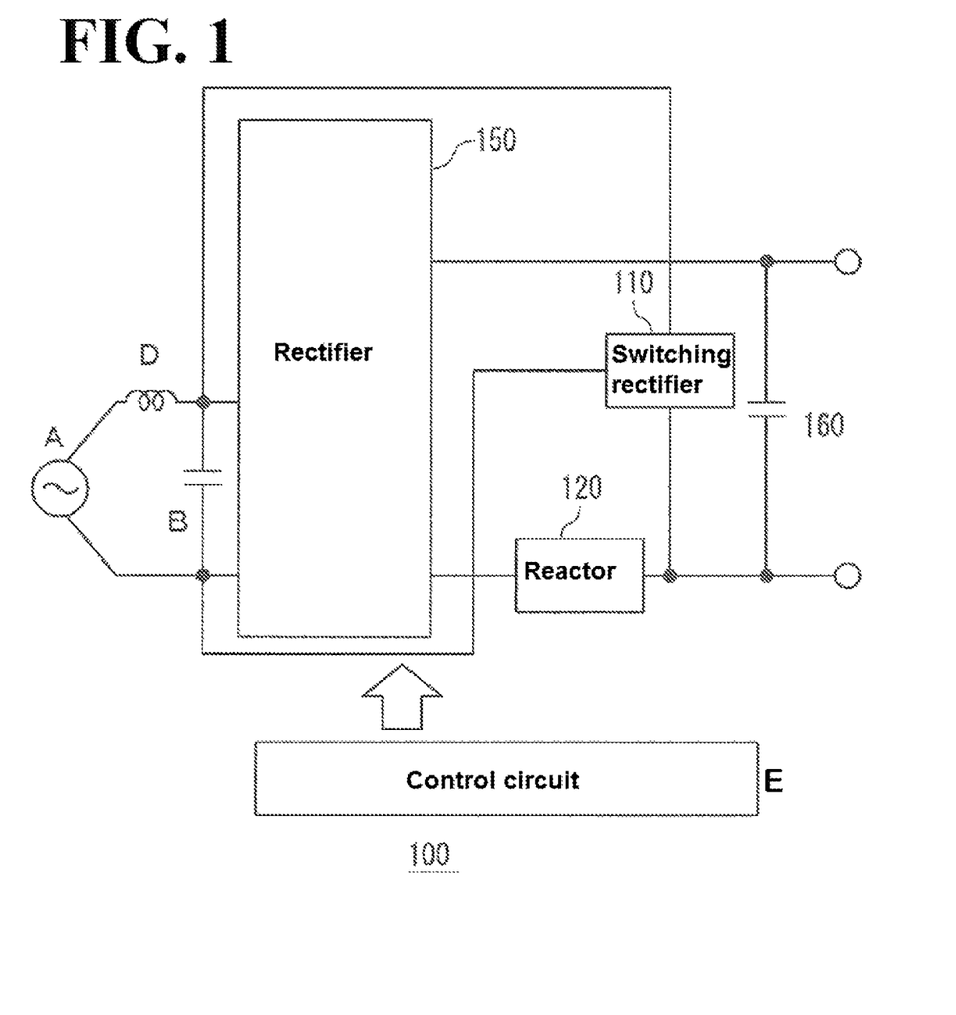
FIG. 1 is a schematic diagram illustrating an alternating-current/direct-current converter according to any of the embodiments of the present invention.

FIG. 1 is a schematic diagram illustrating an alternating-current/direct-current (AC/DC) converter 100 according to any of the embodiments of the present invention. The AC/DC converter 100 converts alternating-current (AC) voltage ($V_{ac}$) output from an AC power source A into direct-current (DC) voltage ($V_{dc}$). The AC/DC converter 100 includes a rectifier 150, a reactor 120, a capacitor 160, and a switching rectifier 110. The rectifier 150 rectifies AC voltage and outputs DC. The switching rectifier 110 is coupled to the AC power source A. By the switching operation of the switching rectifier 110, DC voltage is output to between the terminals of the capacitor 160. The AC/DC converter 100 includes an AC capacitor B and an AC reactor D. The AC power source A supplies power to the AC/DC converter 100 through a low-frequency filter circuit formed by the AC capacitor B and the AC reactor D.

The AC/DC converter 100 further includes a control circuit E. The control circuit E compares the voltage of the AC power source A and the DC voltage with one another, and based on the comparison, controls the switching rectifier 110 to turn into on state or off state.

Figure 2:
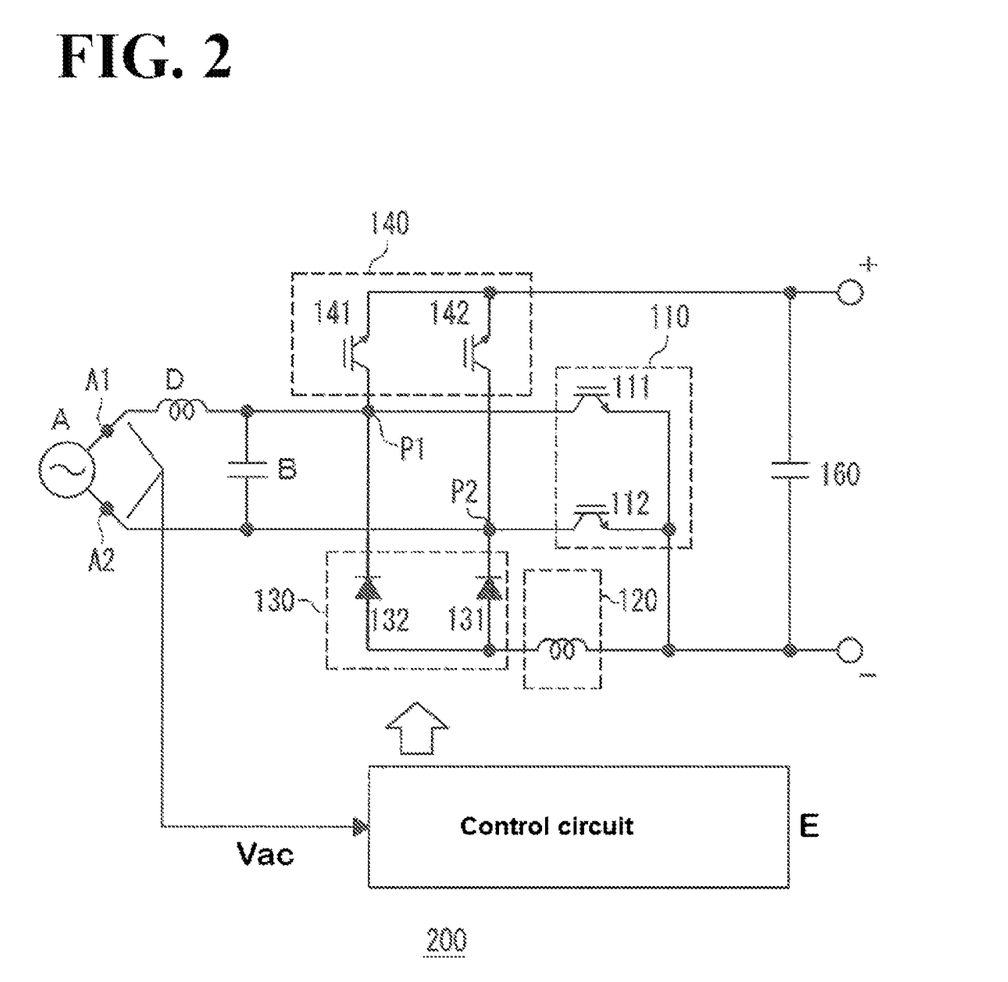
FIG. 2 is a schematic diagram illustrating an alternating-current/direct-current converter according to embodiment 1.

For example, the switching rectifier 110 is switchable between on state and off state. The reactor 120 is coupled to an output of the rectifier 150. Further, the reactor 120 boosts the AC voltage according to the switching between on state and off state of the switching rectifier 110. For example, the first rectifier 130 included in the rectifier 150 is disposed between the AC power source A and the reactor 120 and the second rectifier 140 also included in the rectifier 150 is disposed between the AC power source A and a DC capacitor. For example, the capacitor 160 is a DC capacitor. The first rectifier 130 and the second rectifier 140 are illustrated in FIG. 2 and later drawings.

In the AC/DC converter 100, the first rectifier 130 may constitute the positive side of the DC output of the rectifier 150, while the second rectifier 140 may constitute the negative side of the DC output of the rectifier 150. Alternatively, in the AC/DC converter 100, the first rectifier 130 may constitute the negative side of the DC output of the rectifier 150, while the second rectifier 140 may constitute the positive side of the DC output of the rectifier 150.

When the control circuit E controls the switching rectifier 110 to turn into on state, the switching rectifier 110 and the rectifier 150 form a circuit to accumulate energy in the reactor 120. When the control circuit E controls the switching rectifier 110 to turn into off state, the rectifier 150 forms a circuit to release energy from the reactor 120 to the capacitor 160. As a result, the AC voltage is boosted and the boosted voltage is output to between the terminals of the capacitor 160. One specific example is that when the control circuit E controls the switching rectifier 110 to turn into on state, the switching rectifier 110 and the first rectifier 130 form a circuit to accumulate energy in the reactor 120. When the control circuit E controls the switching rectifier 110 to turn into off state, the first rectifier 130 and the second rectifier 140 form a circuit to release energy from the reactor 120 to the capacitor 160.

The reactor 120 boosts the AC voltage according to the switching between on state and off state of the switching rectifier 110. In addition to functioning as a booster circuit, the AC/DC converter 100 may also function as a step-down circuit, which is implemented by the control circuit E controlling the switching rectifier 110 and the rectifier 150. This will be described in detail in embodiment 1 and embodiment 2 by referring to FIGS. 2 to 5A and 5B.

In the AC/DC converter 100, when the switching rectifier 110 is turned into on state, the switching rectifier 110 and the first rectifier 130 form a rectifier circuit. When the switching rectifier 110 is turned into off state, the first rectifier 130 and the second rectifier 140 form a rectifier circuit. Thus, regardless of whether the switching rectifier 110 is in on state or off state, a total of two semiconductor elements exist along the path through which the current flows, namely the switching rectifier 110 and the first rectifier 130, or the first rectifier 130 and the second rectifier 140. Thus, the AC/DC converter 100 reduces the number of the semiconductor elements that exist along the path through which the current flows, thereby reducing the conduction loss, as compared with the above-described conventional AC/DC converter, where a total of three semiconductor elements exist along the path through which the current flows.

Embodiment 1

FIG. 2 is a schematic diagram illustrating an AC/DC converter 200 according to embodiment 1. The AC/DC converter 200 converts AC voltage ($V_{ac}$) output from the AC power source A into DC voltage ($V_{dc}$). The AC/DC converter 200 includes the switching rectifier 110, the reactor 120, the capacitor 160, the first rectifier 130, and the second rectifier 140. The AC/DC converter 200 includes the AC capacitor B and the AC reactor D. The AC/DC converter 200 further includes the control circuit E. The control circuit E acquires an output from a detection circuit to detect the AC voltage $V_{ac}$, and acquires, from an external command tool (not shown) or the like, a DC voltage command value $V_{dc\text{-}ref}$ as a command of the DC output voltage. The DC voltage command value $V_{dc\text{-}ref}$ may be set in the control circuit E.

The AC power source A includes a terminal A1 and a terminal A2. In embodiment 1, $V_{ac}$ is defined as "$V_{ac}$ =the potential of the terminal A1−the potential of the terminal A2". That is, "$V_{ac} \geq 0$" denotes that the potential of the terminal A1 is equal to or more than the potential of the terminal A2, and "$V_{ac} < 0$" denotes that the potential of the terminal A1 is lower than the potential of the terminal A2.

The AC/DC converter 200 is one specific example of the AC/DC converter 100. In the AC/DC converter 200, the elements having same functions as in the AC/DC converter 100 are designated the same reference numerals and will not be elaborated here.

In the AC/DC converter 200, the reactor 120 and the switching rectifier 110 are configured such that the current flowing through the reactor 120 flows to the negative side of the output of the rectifier 150 when the switching rectifier 110 is in on state. Specifically, as shown in FIG. 2, the first rectifier 130 constitutes the negative side of the DC output of the rectifier 150, while the second rectifier 140 constitutes the positive side of the DC output of the rectifier 150. The reactor 120, the first rectifier 130, and the switching rectifier 110 are coupled to each other so that the current flowing through the reactor 120 flows to the first rectifier 130 when the switching rectifier 110 is in on state.

The first rectifier 130 includes a first rectifier element 131 and a second rectifier element 132. The second rectifier 140 includes a first switching element 141 and a second switching element 142. The first switching element 141 and the second rectifier element 132 are coupled to one another at a first common coupling point P1, while the second switching element 142 and the first rectifier element 131 are coupled to one another at a second common coupling point P2. The switching rectifier 110 includes a third switching element 111 and a fourth switching element 112.

The first switching element 141, the second switching element 142, the third switching element 111, and the fourth switching element 112 are reverse-blocking insulated gate bipolar transistors (IGBTs).

Figure 3A:
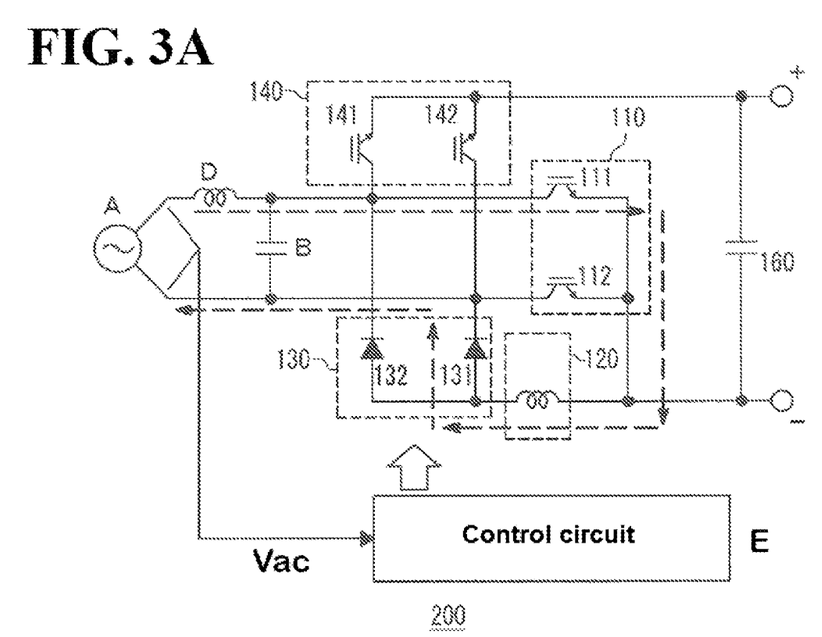
FIGS. 3A and 3B each are a schematic diagram illustrating a current flow in the alternating-current/direct-current converter according to embodiment 1.
Figure 3B:
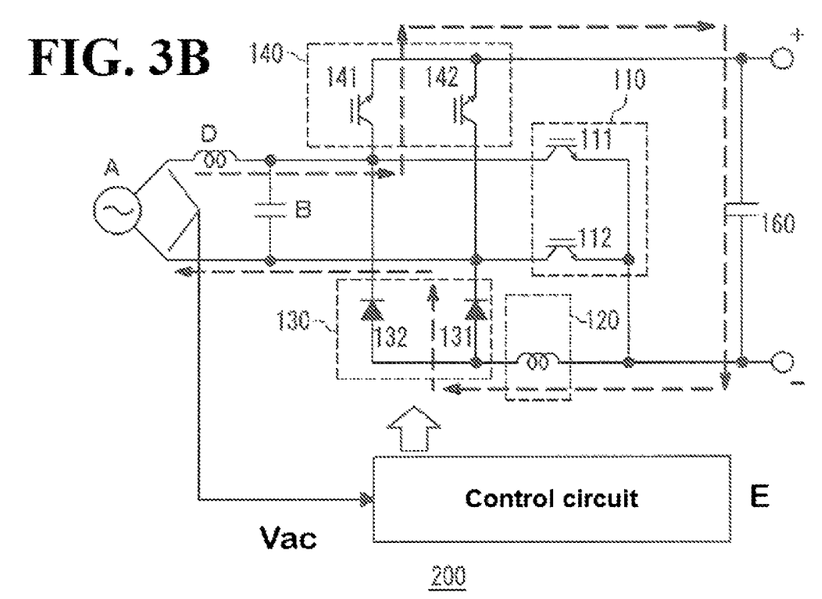

Each of FIGS. 3A and 3B is a schematic diagram illustrating a current flow in the AC/DC converter 200 according to embodiment 1. FIG. 3A illustrates a current flow in the AC/DC converter 200 with the switching rectifier 110 in on state. FIG. 3B illustrates a current flow in the AC/DC converter 200 with the switching rectifier 110 in off state.

Current path switching of the switching rectifier 110 in conjunction with pulse driving when $V_{ac} \geq 0$ will be described by referring to FIGS. 3A and 3B.

A boost chopper operation of the AC/DC converter 200 will be described below. The control circuit E calculates an absolute value $|V_{ac}|$ from a detected value of the AC voltage $V_{ac}$. The AC/DC converter 200 performs its boost chopper operation when the relationship "$|V_{ac}| \leq V_{dc\text{-}ref}$" is established between the absolute value $|V_{ac}|$ of the AC power source voltage and the DC voltage command value $V_{dc\text{-}ref}$. The control circuit E transmits a gate drive signal to the reverse-blocking IGBT 141 and the reverse-blocking IGBT 142 so that the first switching element 141 (reverse-blocking IGBT 141) and the second switching element 142 (reverse-blocking IGBT 142) of the second rectifier 140 are kept on state. The control circuit E then pulse-drives the third switching element 111 (reverse-blocking IGBT 111) and the fourth switching element 112 (reverse-blocking IGBT 112) of the switching rectifier 110 simultaneously, thereby turning the AC/DC converter 200 into boost chopper operation. In this pulse driving, in order that the time ratio between the on state and off state of the switching rectifier 110 is equal to the ratio between $|V_{ac}|$ and $V_{dc\text{-}ref}$, the control circuit E transmits a gate drive signal to the third switching element 111 and the fourth switching element 112, and drives the third switching element 111 and the fourth switching element 112 between on state and off state.

A current flow in the AC/DC converter 200 will be described by referring to FIG. 3A. When the switching rectifier 110 is in on state, the current flowing from the AC power source A flows through the reverse-blocking IGBT 111, the reactor 120, and the first rectifier element 131 in this order. The switching rectifier 110 and the first rectifier 130 form a circuit to accumulate energy in the reactor 120.

Next, a current flow in the AC/DC converter 200 will be described by referring to FIG. 3B. When the switching rectifier 110 is in off state, the current flowing from the AC power source A flows through the reverse-blocking IGBT 141, the capacitor 160, the reactor 120, and the first rectifier element 131 in this order. The first rectifier 130 and the second rectifier 140 form a circuit to release energy from the reactor 120.

Thus, description has been made by referring to FIGS. 3A and 3B with regard to current path switching of the switching rectifier 110 in conjunction with pulse driving when $V_{ac} \geq 0$.

Current path switching of the switching rectifier 110 in conjunction with pulse driving when $V_{ac} < 0$ will be described below. When the switching rectifier 110 is in on state, the current flowing from the AC power source A flows through the reverse-blocking IGBT 112, the reactor 120, and the second rectifier element 132 in this order. The switching rectifier 110 and the first rectifier 130 form a circuit to accumulate energy in the reactor 120. When the switching rectifier 110 is in off state, the current flowing from the AC power source A flows through the reverse-blocking IGBT 142, the capacitor 160, the reactor 120, and the second rectifier element 132 in this order. The first rectifier 130 and the second rectifier 140 form a circuit to release energy from the reactor 120.

In the pulse driving of the switching rectifier 110, it is not necessary to pulse-drive both the reverse-blocking IGBT 111 and the reverse-blocking IGBT 112. When $V_{ac} \geq 0$, it is possible to pulse-drive only the reverse-blocking IGBT 111 among the reverse-blocking IGBT 111 and the reverse-blocking IGBT 112, while keeping the reverse-blocking IGBT 112 continuously in off state. This reduces power supplied to the gate drive circuit for IGBT driving. When $V_{ac} < 0$, it is possible to pulse-drive the reverse-blocking IGBT 112, while keeping the reverse-blocking IGBT 111 continuously in off state. This reduces power supplied to the gate drive circuit for IGBT driving.

Additionally, it is possible to select and drive either the reverse-blocking IGBT 141 or the reverse-blocking IGBT 142 of the second rectifier 140 in accordance with the polarity of the AC voltage. This reduces power supplied to the gate drive circuit for IGBT driving. When $V_{ac} \geq 0$, it is possible to keep the reverse-blocking IGBT 141 continuously in on state and keep the reverse-blocking IGBT 142 continuously in off state. This reduces power supplied to the gate drive circuit for IGBT driving. When $V_{ac} < 0$, it is possible to, inversely, keep the reverse-blocking IGBT 142 continuously in on state and keep the reverse-blocking IGBT 141 continuously in off state. This reduces power supplied to the gate drive circuit for IGBT driving.

A step-down chopper operation of the AC/DC converter 200 will be described below. The AC/DC converter 200 performs its step-down chopper operation when the relationship "$|V_{ac}| > V_{dc-ref}$" is established between the absolute value $|V_{ac}|$ of the AC power source voltage and the DC voltage command value $V_{dc-ref}$. The control circuit E keeps the reverse-blocking IGBT 111 and the reverse-blocking IGBT 112 of the switching rectifier 110 continuously in off state. When $V_{ac} \geq 0$, the control circuit E turns the reverse-blocking IGBT 142 into on state and pulse-drives the reverse-blocking IGBT 141, thereby turning the AC/DC converter 200 into step-down chopper operation. In this pulse driving, in order that the ratio between the on-state time of the reverse-blocking IGBT 141 and the total of the on-state time and the off-state time of the reverse-blocking IGBT 141 is equal to the ratio between $V_{dc-ref}$ and $|V_{ac}|$, the control circuit E controls the gate of the reverse-blocking IGBT 141 between on state and off state. Here, the reverse-blocking IGBT 141 functions as a switching element, while the reverse-blocking IGBT 142 functions as a free wheel diode.

When $V_{ac} < 0$, the control circuit E turns the reverse-blocking IGBT 141 into on state and pulse-drives the reverse-blocking IGBT 142, thereby turning the AC/DC converter 200 into step-down chopper operation. Here, the reverse-blocking IGBT 142 functions as a switching element, while the reverse-blocking IGBT 141 functions as a free wheel diode.

Thus, description has been made with regard to a current flow in the AC/DC converter 200 according to embodiment 1 by referring to FIGS. 3A and 3B. The control circuit E may detect a current $I_{dc}$ through the reactor 120 and perform the pulse driving such that the waveform of $I_{dc}$ has a similar shape with that of $|V_{ac}|$ which is the full-wave rectification waveform of $V_{ac}$, thereby controlling the input power factor at 1. The control circuit E may also change the peak value of the waveform of $I_{dc}$ to control the DC voltage $V_{dc}$ to match the DC voltage command value $V_{dc-ref}$.

The DC voltage command value $V_{dc-ref}$ is variable from zero to equal to or more than the peak voltage of $|V_{ac}|$ in accordance with the load situation. As described above by referring to FIGS. 2 and 3A and 3B, in the AC/DC converter 200, the circuit having the step-down circuit function and the circuit having the booster circuit function are switched to and from one another, and the DC voltage $V_{dc}$ follows the varying DC voltage command value $V_{dc-ref}$ by detecting the AC voltage $V_{ac}$ without regard to an instantaneous value of the AC voltage $V_{ac}$.

In the AC/DC converter 200, when the switching rectifier 110 is turned into on state, the switching rectifier 110 and the first rectifier 130 form a rectifier circuit, while when the switching rectifier 110 is turned into off state, the first rectifier 130 and the second rectifier 140 form a rectifier circuit. Thus, regardless of whether the switching rectifier 110 is in on state or off state, a total of two semiconductor elements exist along the path through which the current flows. Thus, the AC/DC converter 200 reduces the number of the semiconductor elements that exist along the path through which the current flows, thereby reducing the conduction loss, as compared with the above-described conventional AC/DC converter, where a total of three semiconductor elements exist along the path through which the current flows.

Embodiment 2

Figure 4:
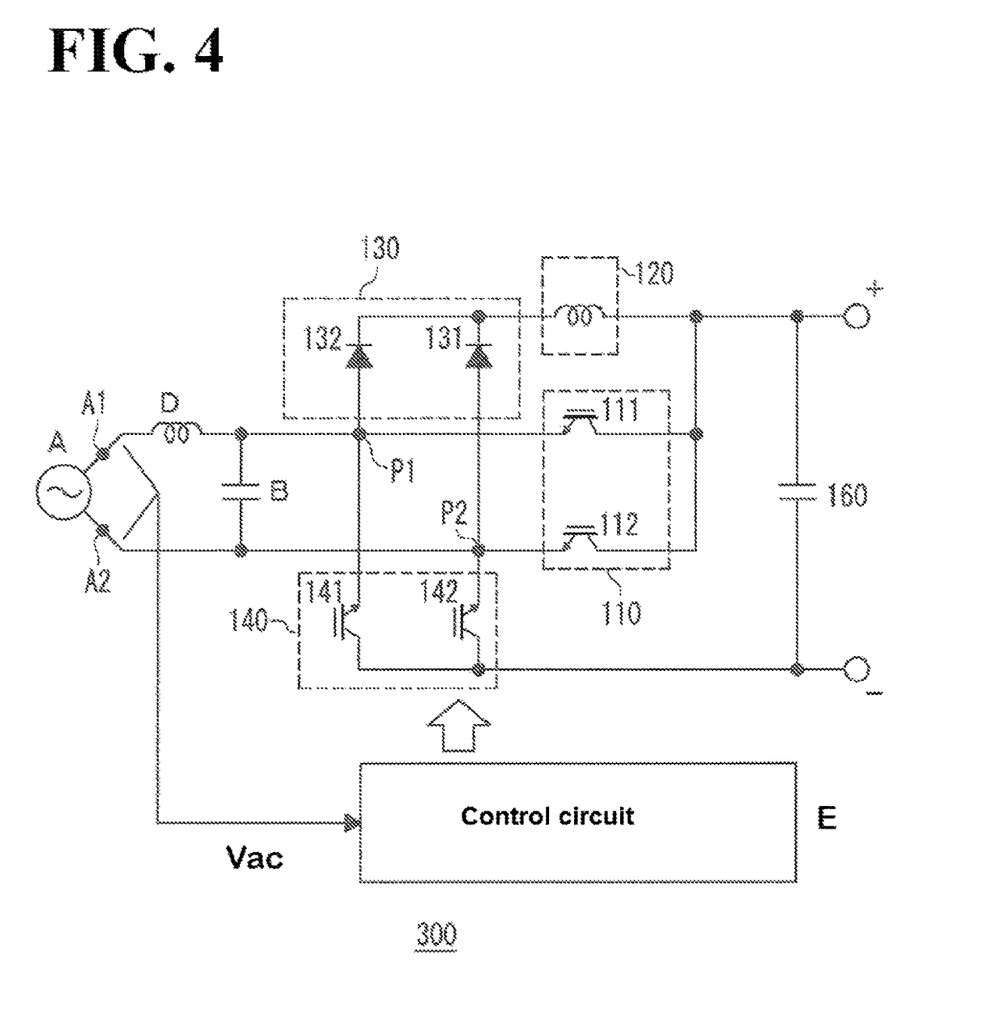
FIG. 4 is a schematic diagram illustrating an alternating-current/direct-current converter according to embodiment 2.

FIG. 4 is a schematic diagram illustrating an AC/DC converter 300 according to embodiment 2. The AC/DC converter 300 converts AC voltage ($V_{ac}$) output from the AC power source A into DC voltage ($V_{dc}$). The AC/DC converter 300 includes the switching rectifier 110, the reactor 120, the first rectifier 130, the second rectifier 140, the AC capacitor B, the capacitor 160, and the AC reactor D. Similar to embodiment 1, the AC/DC converter 300 further includes the control circuit E and acquires a detected value of the AC voltage $V_{ac}$ and the DC voltage command value $V_{dc-ref}$.

In embodiment 2, similar to embodiment 1, the AC power source A includes the terminal A1 and the terminal A2. In embodiment 2, $V_{ac}$ is defined as "$V_{ac}$=the potential of the terminal A1−the potential of the terminal A2". That is, "$V_{ac} \geq 0$" denotes that the potential of the terminal A1 is equal to or more than the potential of the terminal A2, and "$V_{ac} < 0$" denotes that the potential of the terminal A1 is lower than the potential of the terminal A2.

The AC/DC converter 300 is one specific example of the AC/DC converter 100. In the AC/DC converter 300, the elements having same functions as in the AC/DC converter 100 are designated the same reference numerals and will not be elaborated here. The AC/DC converter 300 is different from the AC/DC converter 200 according to embodiment 1 in that the reactor 120 is shifted to the positive side of the rectifier circuit, and accordingly, the arrangement of the reverse-blocking IGBTs and rectifier elements is also changed.

In the AC/DC converter 300, the reactor 120 and the switching rectifier 110 are configured such that the current flowing through the reactor 120 flows to the positive side of the output of the rectifier 150 when the switching rectifier 110 is in on state. Specifically, as shown in FIG. 4, the first rectifier 130 constitutes the positive side of the DC output of the rectifier 150, while the second rectifier 140 constitutes the negative side of the DC output of the rectifier 150. The reactor 120, the first rectifier 130, and the switching rectifier 110 are disposed such that the current flowing through the reactor 120 flows to the first rectifier 130 when the switching rectifier 110 is in on state.

The first rectifier 130 includes the first rectifier element 131 and the second rectifier element 132. The second rectifier 140 includes the first switching element 141 and the second switching element 142. The first switching element 141 and the second rectifier element 132 are coupled to one another at the first common coupling point P1, while the second switching element 142 and the first rectifier element 131 are coupled to one another at the second common coupling point P2. The switching rectifier 110 includes the third switching element 111 and the fourth switching element 112.

The first switching element 141, the second switching element 142, the third switching element 111, and the fourth switching element 112 are reverse-blocking IGBTs.

Figure 5A:
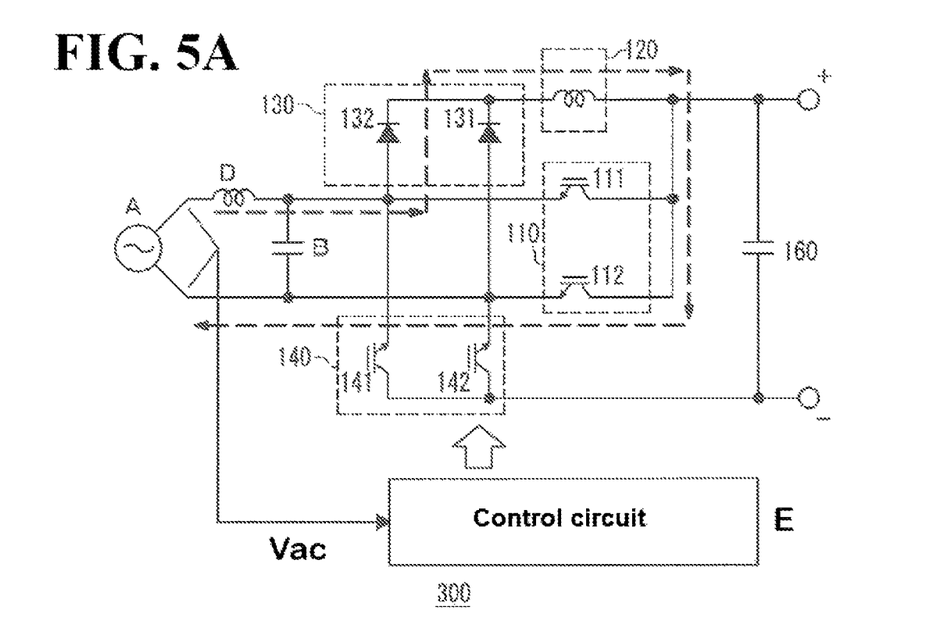
FIGS. 5A and 5B each are a schematic diagram illustrating a current flow in the alternating-current/direct-current converter according to embodiment 2.
Figure 5B:
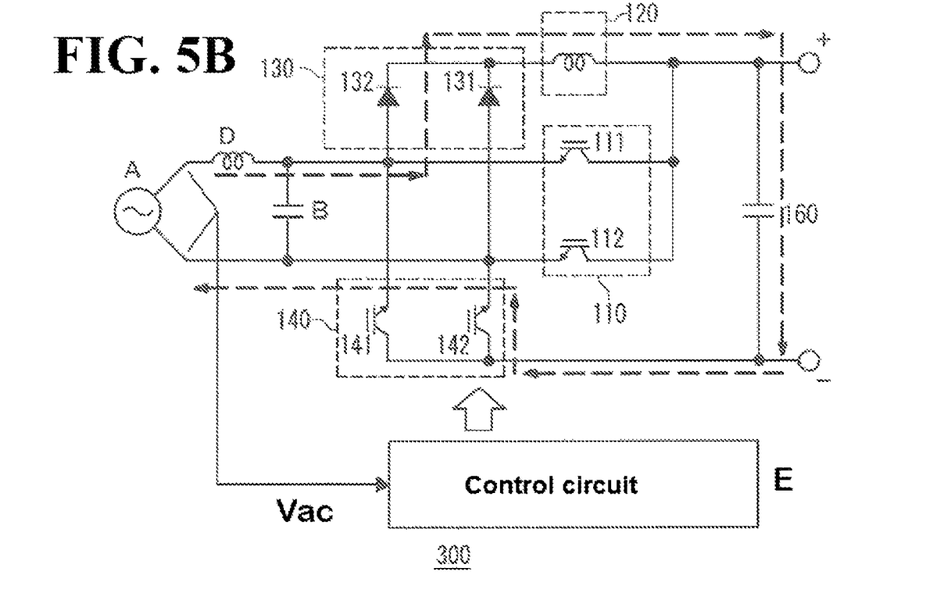

Each of FIGS. 5A and 5B is a schematic diagram illustrating a current flow in the AC/DC converter 300 according to embodiment 2. FIG. 5A illustrates a current flow with the switching rectifier 110 in on state in the AC/DC converter 300. FIG. 5B illustrates a current flow with the switching rectifier 110 in off state in the AC/DC converter 300.

Current path switching of the switching rectifier 110 in conjunction with pulse driving when $V_{ac} \geq 0$ will be described by referring to FIGS. 5A and 5B.

A boost chopper operation of the AC/DC converter 300 will be described. Similar to embodiment 1, the control circuit E performs the boost chopper operation when the relationship "$|V_{ac}| \leq V_{dc\text{-}ref}$" is established between the detection value $|V_{ac}|$ of the absolute value of the AC voltage $V_{ac}$ and the DC voltage command value $V_{dc\text{-}ref}$. The control circuit E transmits a gate drive signal to the reverse-blocking IGBT 141 and the reverse-blocking IGBT 142 so that the first switching element 141 (reverse-blocking IGBT 141) and the second switching element 142 (reverse-blocking IGBT 142) of the second rectifier 140 are continuously kept on state. The control circuit E then pulse-drives the third switching element 111 (reverse-blocking IGBT 111) and the fourth switching element 112 (reverse-blocking IGBT 112) of the switching rectifier 110 simultaneously, thereby turning the AC/DC converter 300 into boost chopper operation. The time for which the switching rectifier 110 is in on state and the time for which the switching rectifier 110 is in off state are determined by a similar method to the method in embodiment 1.

A current flow in the AC/DC converter 300 will be described by referring to FIG. 5A. When the switching rectifier 110 is in on state, the current flowing from the AC power source A flows through the second rectifier element 132, the reactor 120, and the reverse-blocking IGBT 112 in this order. The switching rectifier 110 and the first rectifier 130 form a circuit to accumulate energy in the reactor 120.

Next, a current flow in the AC/DC converter 300 will be described by referring to FIG. 5B. When the switching rectifier 110 is in off state, the current flowing from the AC power source A flows through the second rectifier element 132, the reactor 120, the capacitor 160, and the reverse-blocking IGBT 142 in this order. The first rectifier 130 and the second rectifier 140 form a circuit to release energy from the reactor 120.

Thus, description has been made by referring to FIGS. 5A and 5B with regard to current path switching of the switching rectifier 110 in conjunction with pulse driving when $V_{ac} \geq 0$.

Current path switching of the switching rectifier 110 in conjunction with pulse driving when $V_{ac} < 0$ will be described below. When the switching rectifier 110 is in on state, the current flowing from the AC power source A flows through the first rectifier element 131, the reactor 120, and the reverse-blocking IGBT 111 in this order. The switching rectifier 110 and the first rectifier 130 form a circuit to accumulate energy in the reactor 120. When the switching rectifier 110 is in off state, the current flowing from the AC power source A flows through the first rectifier element 131, the reactor 120, the capacitor 160, and the reverse-blocking IGBT 141 in this order. The first rectifier 130 and the second rectifier 140 form a circuit to release energy from the reactor 120.

In the pulse driving of the switching rectifier 110, it is not necessary to pulse-drive both the reverse-blocking IGBT 111 and the reverse-blocking IGBT 112. When $V_{ac} \geq 0$, it is possible to pulse-drive only the reverse-blocking IGBT 112, while keeping the reverse-blocking IGBT 111 in continually off state. This reduces power supplied to the gate drive circuit for IGBT driving. When $V_{ac} < 0$, it is possible to pulse-drive only the reverse-blocking IGBT 111, while keeping the reverse-blocking IGBT 112 in continually off state. This reduces power supplied to the gate drive circuit for IGBT driving.

Additionally, it is possible to select and drive either the reverse-blocking IGBT 141 or the reverse-blocking IGBT 142 of the second rectifier 140 in accordance with the polarity of the AC voltage. This reduces power supplied to the gate drive circuit for IGBT driving. When $V_{ac} \geq 0$, it is possible to keep the reverse-blocking IGBT 142 continuously in on state and keep the reverse-blocking IGBT 141 continuously in off state. This reduces power supplied to the gate drive circuit for IGBT driving. When $V_{ac} < 0$, it is possible to, inversely, keep the reverse-blocking IGBT 141 continuously in on state and keep the reverse-blocking IGBT 142 continuously in off state. This reduces power supplied to the gate drive circuit for IGBT driving.

A step-down chopper operation of the AC/DC converter 300 will be described below. The AC/DC converter 300 performs its step-down chopper operation when the relationship "$|V_{ac}| > V_{dc\text{-}ref}$" is established between the absolute value $|V_{ac}|$ of the AC voltage and the DC voltage command value $V_{dc\text{-}ref}$. The control circuit E keeps the reverse-blocking IGBT 111 and the reverse-blocking IGBT 112 of the switching rectifier 110 continuously in off state. When $V_{ac} \geq 0$, the control circuit E keeps the reverse-blocking IGBT 141 continuously in on state and pulse-drives the reverse-blocking IGBT 142, thereby turning the AC/DC converter 300 into step-down chopper operation. In this pulse driving, in order that the ratio between the on-state time of the reverse-blocking IGBT 142 and the total of the on-state time and the off-state time of the reverse-blocking IGBT 142 is equal to the ratio between $V_{dc\text{-}ref}$ and $|V_{ac}|$, the control circuit E controls the gate of the reverse-blocking IGBT 142 between on state and off state. Here, the reverse-blocking IGBT 142 functions as a switching element, while the reverse-blocking IGBT 141 functions as a free wheel diode.

When $V_{ac} < 0$, the control circuit E turns the reverse-blocking IGBT 142 into on state and pulse-drives the reverse-blocking IGBT 141, thereby turning it into step-down chopper operation. Here, the reverse-blocking IGBT 141 functions as a switching element, while the reverse-blocking IGBT 142 functions as a free wheel diode.

Thus, description has been made with regard to a current flow in the AC/DC converter 300 according to embodiment 2 by referring to FIGS. 5A and 5B. Similar to embodiment 1, the control circuit E may detect current $I_{dc}$ through the reactor 120 and perform the pulse driving such that the waveform of $I_{dc}$ has a similar shape with that of $|V_{ac}|$ which is the full-wave rectification waveform of $V_{ac}$, thereby controlling the input power factor at 1. The control circuit E may also change the peak value of the waveform of $I_{dc}$ to control the DC voltage $V_{dc}$ to match the DC voltage command value $V_{dc\text{-}ref}$.

The DC voltage command value $V_{dc\text{-}ref}$ is variable from zero to equal to or more than the peak voltage of $|V_{ac}|$ in accordance with the load situation. Similar to embodiment 1, the DC voltage $V_{dc}$ can follow the varying DC voltage command value $V_{dc\text{-}ref}$ by detecting the AC voltage $V_{ac}$ without regard to an instantaneous value of the AC voltage $V_{ac}$.

In the AC/DC converter 300, when the switching rectifier 110 is turned into on state, the switching rectifier 110 and the first rectifier 130 form a rectifier circuit, while when the switching rectifier 110 is turned into off state, the first rectifier 130 and the second rectifier 140 form a rectifier circuit. Thus, regardless of whether the switching rectifier 110 is in on state or off state, a total of two semiconductor elements exist along the path through which the current flows. Thus, the AC/DC converter 300 reduces the number of the semiconductor elements that exist along the path through which the current flows, thereby reducing the conduction loss, as compared with the above-described conventional AC/DC converter, where a total of three semiconductor elements exist along the path through which the current flows.

Thus, description has been made with regard to a current flow in the AC/DC converters according to the embodiments by referring to FIGS. 1 to 5A and 5B.

The rectifier 150 may be made up of only a rectifier element. The first rectifier 130 and the second rectifier 140 each may also be made up of only a rectifier element. In this case, the AC/DC converter according to any of the embodiments has the half-wave rectification function instead of the full-wave rectification function, and has only the boosting function.

The first switching element 141, the second switching element 142, the third switching element 111, and the fourth switching element 112 will not be limited to reverse-blocking IGBTs. The first switching element 141, the second switching element 142, the third switching element 111, and the fourth switching element 112 each may also be other than a reverse-blocking IGBT, examples including, but not limited to, a series assembly of a rectifier element and a switching element without the reverse-blocking function (for example, MOSFET and IGBT without the reverse-blocking function). Use of MOSFET as the switching element ensures higher switching frequencies than the use of reverse-blocking IGBT, and reduces the reactor value and shape of the reactor 120.

The embodiments of the present invention will find applications in AC/DC converters to convert AC voltage output from an AC power source into DC voltage.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An alternating-current/direct-current converter comprising:
   a rectifier configured to rectify alternating-current voltage output from an alternating-current power source, thereby converting the alternating-current voltage into direct-current voltage, and to output the direct-current voltage;
   a reactor;
   a capacitor comprising terminals; and
   a switching rectifier coupled to the alternating-current power source,
   wherein the converter is configured to accumulate energy into the reactor and release the accumulated energy by a switching operation of the switching rectifier to boost the alternating-current voltage, the converter is further configured to step-down the alternating-current voltage by a switching operation of the rectifier, and the direct-current voltage is output to the capacitor.

2. The alternating-current/direct-current converter according to claim 1,
   wherein when the switching rectifier is in on state, the reactor is configured to accumulate energy from the alternating-current power source,
   wherein when the switching rectifier is in off state, the reactor is configured to release energy, and
   wherein when the alternating-current voltage is boosted, the boosted voltage is output to between the terminals of the capacitor.

3. The alternating-current/direct-current converter according to claim 2,
   wherein the rectifier comprises
      a first rectifier disposed between the alternating-current power source and the reactor, and
      a second rectifier disposed between the alternating-current power source and the capacitor,
   wherein when the switching rectifier is in on state, the switching rectifier and the first rectifier are configured to form a circuit to accumulate energy in the reactor, and
   wherein when the switching rectifier is in off state, the first rectifier and the second rectifier are configured to form a circuit to release energy from the reactor to the capacitor.

4. The alternating-current/direct-current converter according to claim 3,
   wherein the second rectifier comprises a switching element.

5. The alternating-current/direct-current converter according to claim 4,
   wherein the first rectifier is configured to be comprised in a negative side of a direct- current output of the rectifier, and
   wherein the second rectifier is configured to be comprised in a positive side of the direct- current output of the rectifier.

6. The alternating-current/direct-current converter according to claim 4,
   wherein the first rectifier is configured to be comprised in a positive side of a direct-current output of the rectifier, and
   wherein the second rectifier is configured to be comprised in a negative side of the direct-current output of the rectifier.

7. The alternating-current/direct-current converter according to claim 3,
   wherein the first rectifier is configured to be comprised in a negative side of a direct-current output of the rectifier, and
   wherein the second rectifier is configured to be comprised in a positive side of the direct-current output of the rectifier.

8. The alternating-current/direct-current converter according to claim 3,
   wherein the first rectifier is configured to be comprised in a positive side of a direct-current output of the rectifier, and
   wherein the second rectifier is configured to be comprised in a negative side of the direct-current output of the rectifier.

9. The alternating-current/direct-current converter according to claim 2,
   wherein the rectifier comprises
      a first rectifier element,
      a second rectifier element,
      a first switching element coupled to the first rectifier element at a first common coupling point, and
      a second switching element coupled to the second rectifier element at a second common coupling point, and wherein the switching rectifier comprises
a third switching element, and
a fourth switching element.

10. The alternating-current/direct-current converter according to claim 1,
wherein the rectifier comprises
a first rectifier disposed between the alternating-current power source and the reactor, and
a second rectifier disposed between the alternating-current power source and the capacitor,
wherein when the switching rectifier is in on state, the switching rectifier and the first rectifier are configured to form a circuit to accumulate energy in the reactor, and
wherein when the switching rectifier is in off state, the first rectifier and the second rectifier are configured to form a circuit to release energy from the reactor to the capacitor.

11. The alternating-current/direct-current converter according to claim 10, wherein the second rectifier comprises a switching element.

12. The alternating-current/direct-current converter according to claim 11,
wherein the first rectifier is configured to be comprised in a negative side of a direct-current output of the rectifier, and
wherein the second rectifier is configured to be comprised in a positive side of the direct-current output of the rectifier.

13. The alternating-current/direct-current converter according to claim 11,
wherein the first rectifier is configured to be comprised in a positive side of a direct-current output of the rectifier, and
wherein the second rectifier is configured to be comprised in a negative side of the direct-current output of the rectifier.

14. The alternating-current/direct-current converter according to claim 10,
wherein the first rectifier is configured to be comprised in a negative side of a direct-current output of the rectifier, and
wherein the second rectifier is configured to be comprised in a positive side of the direct-current output of the rectifier.

15. The alternating-current/direct-current converter according to claim 10,
wherein the first rectifier is configured to be comprised in a positive side of a direct-current output of the rectifier, and
wherein the second rectifier is configured to be comprised in a negative side of the direct-current output of the rectifier.

16. The alternating-current/direct-current converter according to claim 10,
wherein the rectifier comprises
a first rectifier element,
a second rectifier element,
a first switching element coupled to the first rectifier element at a first common coupling point, and
a second switching element coupled to the second rectifier element at a second common coupling point, and
wherein the switching rectifier comprises
a third switching element, and
a fourth switching element.

17. The alternating-current/direct-current converter according to claim 1,
wherein the rectifier comprises
a first rectifier element,
a second rectifier element,
a first switching element coupled to the first rectifier element at a first common coupling point, and
a second switching element coupled to the second rectifier element at a second common coupling point, and
wherein the switching rectifier comprises
a third switching element, and
a fourth switching element.

18. The alternating-current/direct-current converter according to claim 17, wherein the first switching element, the second switching element, the third switching element, and the fourth switching element each comprise a reverse-blocking insulated gate bipolar transistor.

19. The alternating-current/direct-current converter according to claim 17, wherein the first switching element, the second switching element, the third switching element, and the fourth switching element each comprise a series assembly of a rectifier element and a switching element without a reverse-blocking function.

* * * * *